No. 635,514. Patented Oct. 24, 1899.
T. SCHNUTZ.
APPARATUS FOR DRAWING AND PRESERVING BEER.
(Application filed Nov. 1, 1893.)
(No Model.) 3 Sheets—Sheet 2.
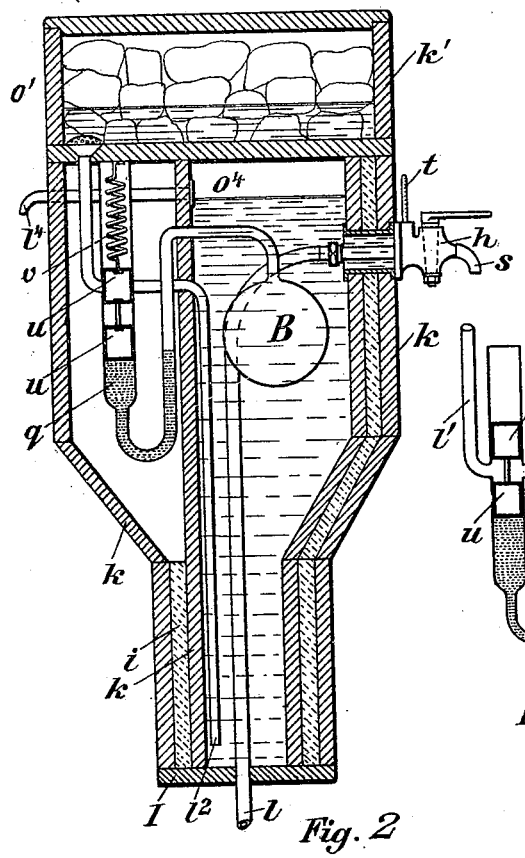
Fig. 2
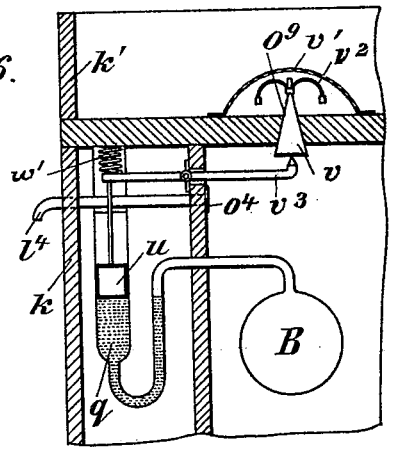
Fig. 6.
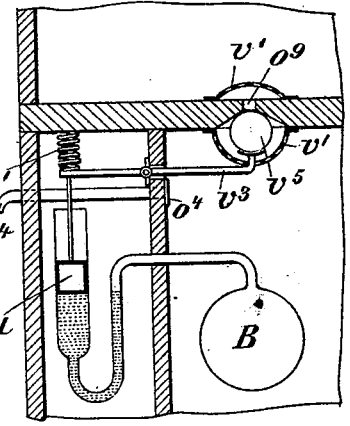
Fig. 7
Fig. 3
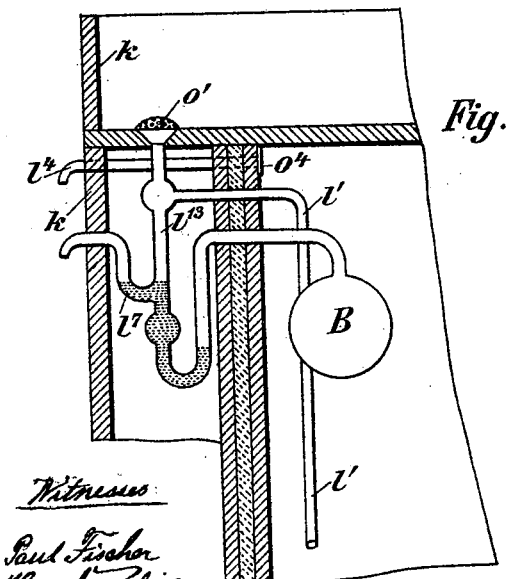
Fig. 4
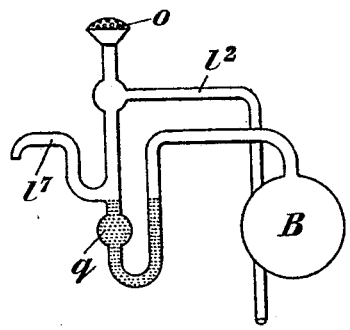
Fig. 5.
Witnesses
Paul Fischer
Hans Lauerkin
Inventor
Theodor Schnutz
by Munn & Co.
Attorneys
THE NORRIS PETERS CO., PHOTO-LITHO., WASHINGTON, D. C.

No. 635,514. Patented Oct. 24, 1899.
T. SCHNUTZ.
APPARATUS FOR DRAWING AND PRESERVING BEER.
(Application filed Nov. 1, 1898.)
(No Model.) 3 Sheets—Sheet 3.

UNITED STATES PATENT OFFICE.

THEODOR SCHNUTZ, OF HANOVER, GERMANY.

APPARATUS FOR DRAWING AND PRESERVING BEER.

SPECIFICATION forming part of Letters Patent No. 635,514, dated October 24, 1899.

Application filed November 1, 1893. Serial No. 489,775. (No model.)

*To all whom it may concern:*

Be it known that I, THEODOR SCHNUTZ, of Hanover, in the German Empire, have invented new and useful Improvements in Apparatus for Drawing and Preserving Beer, of which the following is a specification, reference being had therein to the accompanying drawings.

Figure 1:
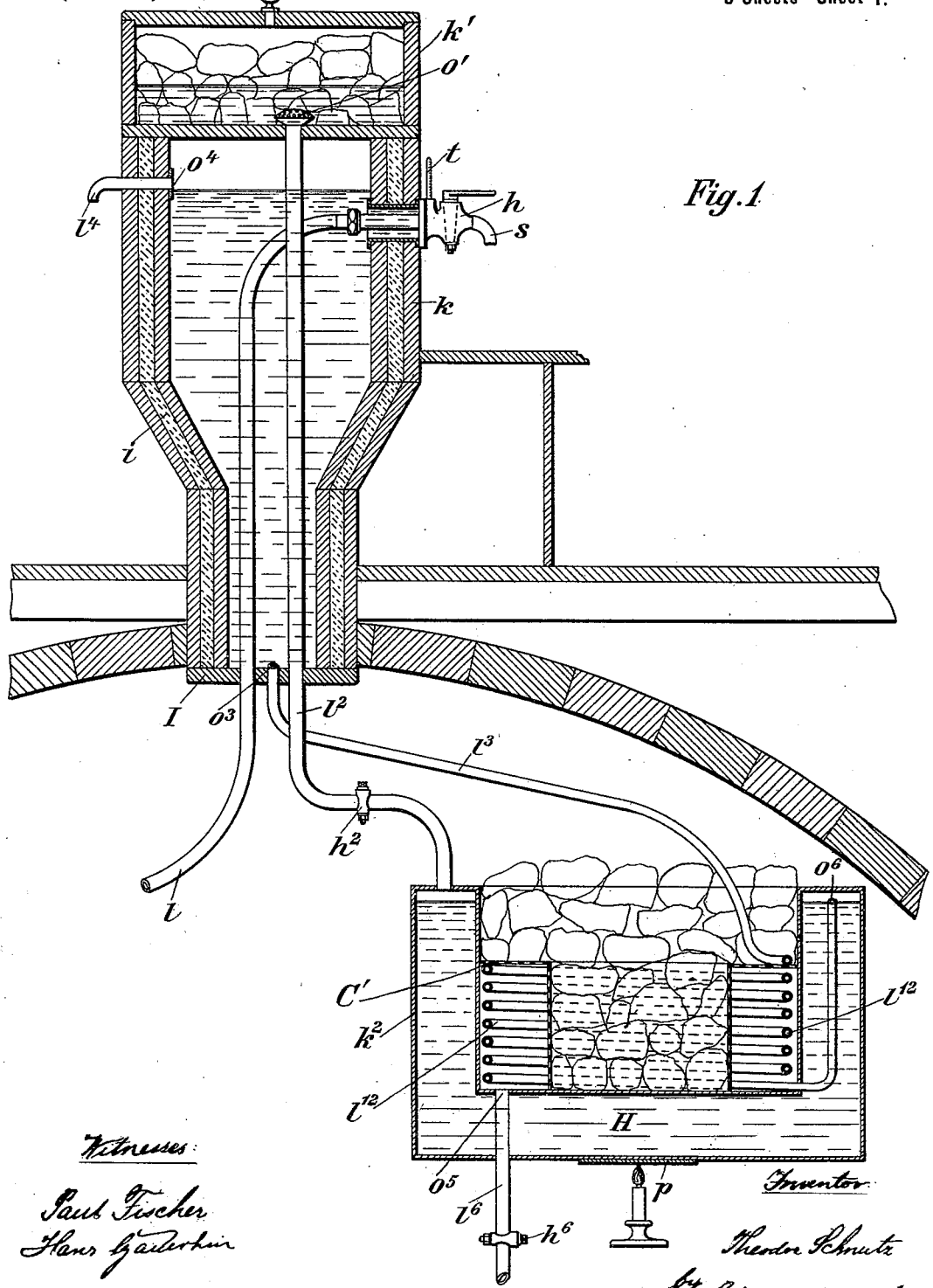
Figure 8:
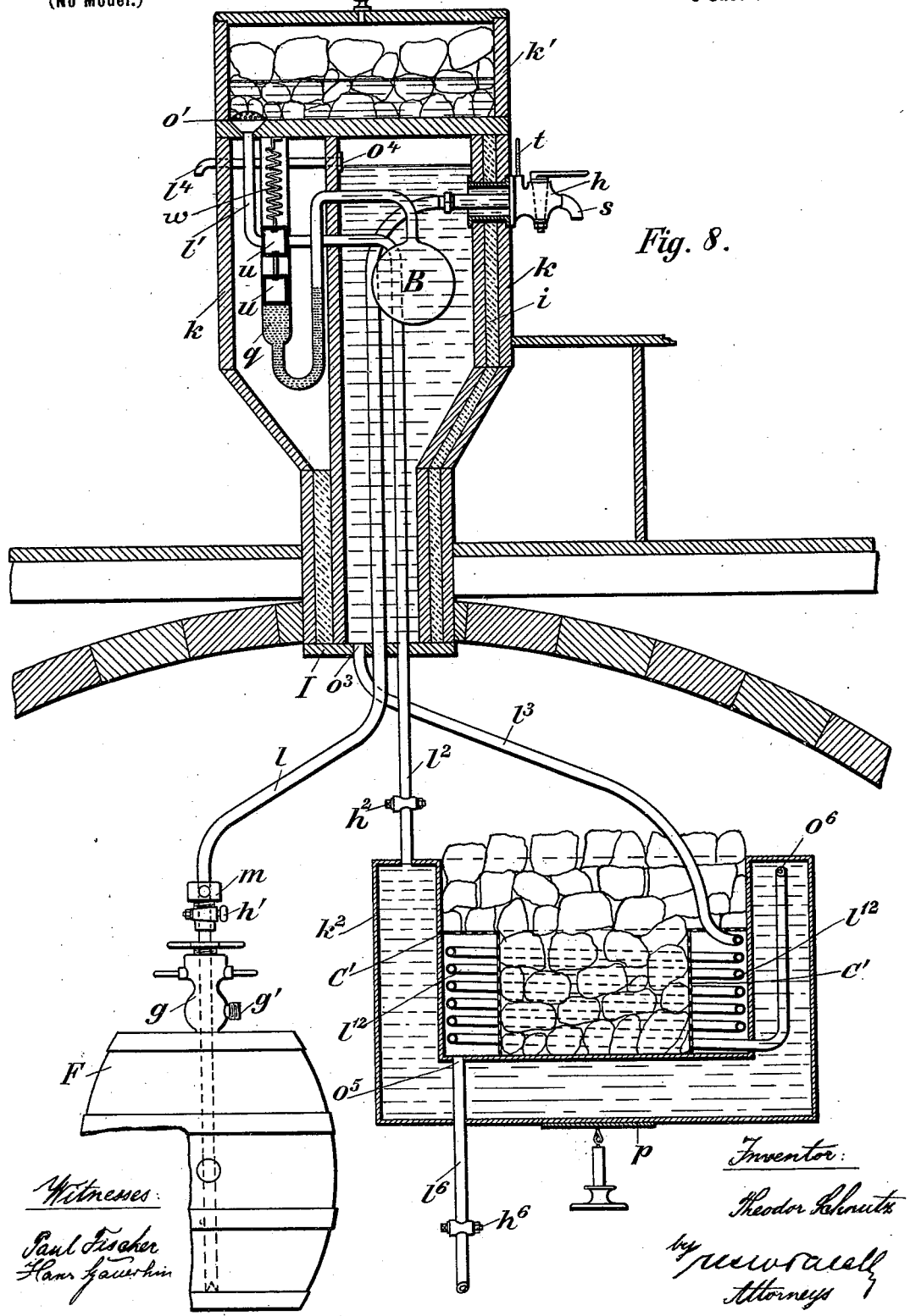

Figure 1 represents a detail vertical sectional view of so much of one embodiment of my invention as is necessary to illustrate the invention. Figs. 2, 3, 4, 5, 6, and 7 are detail views, partly in section, as hereinafter more fully referred to, and showing means for automatically controlling the regulation of the liquid refrigerant. Fig. 8 is a view similar to Fig. 1, but showing the preferred and complete system.

In Fig. 1, $k$ is the tap-box, provided with isolating material $i$. This box contains the conducting-tube $l$, leading from the cellar. At its narrower lower portion $k$ is closed by a plate I. $k'$ is a refrigerating-box standing upon $k$ and filled with water and pieces of ice. The refrigerative water enters through the sieve-opening $o'$ and runs into the refrigeration vessel $k^2$, (situated in the cellar and provided with double walls and large cooling-surfaces,) where it fills the cooled hollow space H. At $o^6$ the water enters the refrigerative coil $l^{12}$, and from this at $o^3$ passes into the tap-box $k$, from where it flows out at $o^4$ through the overflow-tube $l^4$. The refrigerating-box $k^2$ is made of galvanized-iron sheet. The refrigerative coil is built over with a perforated projection-bridge $c'$, so that the pieces of ice which are put into the inner space cannot damage the coil. At $o^5$ a let-off tube $l^6$, with let-off cock $h^6$ for the ice-water, is provided. By means of the cock $h^2$ the water-influx for the refrigeration-box can be regulated. If during the winter it should happen that the temperature of the cellar were lower than desired, the same can easily be brought to the desirable temperature by means of a small flame. To likewise impart this temperature to the water which surrounds the conducting-tube $l$, the flame is placed under the refrigerating vessel $k^2$, to the bottom of which for this purpose a small protection-plate $p$ is riveted or soldered. This arrangement has the following advantages: that it is regulatable, cooling or refrigerating the tap-box and conducting-tubes and simultaneously refrigerating or warming the cellar (which is air-tight and protected by some non-conducting material) and the ice-container $k^3$. This arrangement can be applied everywhere, and therefore is of particular value, since it is entirely independent of a water-main.

In Fig. 2 an automatic cooling arrangement is shown. $k$ is a tap-box provided with isolating material and containing the conducting-tube $l$, which extends into the cellar. $k'$ is a cooling-box resting upon $k$ and filled with water and pieces of ice. The refrigerating-water enters through the opening $o'$ and proceeds into the tap-box $k$ when the piston $u$ is in the position shown in Fig. 3. When, by means of the influx of the refrigerating-water into the tap-box $k$, which at $o^4$ is provided with the overflow-tube $l^4$, a certain temperature—say 9° centigrade—is attained, the highly-expansive gas in the balloon B contracts to such an extent that the position of the mercury $q$ becomes such as indicated in Fig. 2, with the result that the refrigerating-water influx is shut off by the upper portion of the piston $u$. The downward movement of the piston $u$ is effected by the spiral spring $w$. The mercury is adjusted according to the height of the desired temperatures.

In Fig. 6 another construction of the automatic regulator is given. $v$ is a valve situated in the refrigeration-box $k'$, which valve during the opening is kept in a certain position by the three bent rods $v^2$, so that the water of the box $k'$ flows into the tap-box at $o^9$, a strainer $v'$ being provided to protect the valve $v$. The lever $v^3$ is not joined to the valve, but balances it merely upon its extreme end. When the temperature in B has attained a certain height, the valve $v$ opens for a sufficient time until the desired temperature—say 9° centigrade—has been reached. The downward movement of the piston $u$, which causes the closing of the valve $v$, is effected by the spiral spring $w'$. Fig. 7 shows the same principle with ball-valve.

In Fig. 4 the refrigerating-water enters through the sieve-opening into the globular portion of the tube $l^{13}$. The lateral tube $l^2$, leading into the tap-box, terminates in $l'$. Below the globular portion the tube $l^{13}$, on the one hand, terminates into the branch tube $l^7$, whereas, on the other hand, it continues downward and by means of a U-shaped bend is joined to the ball B. At a normal temperature for the tapping and drawing of the beer— say 9° centigrade—the mercury stands in the position shown in Fig. 5. In consequence of this position of the mercury the refrigerating-water entering at $o'$ flows off continuously through $l^7$ and can be utilized for other purposes—for instance, for washing glasses, &c. If, however, the water in $k$ becomes too warm, $q$ will assume the position as in Fig. 4. The efflux through $l^2$ is then closed, which causes the refrigerating-water to run through $l'$ into the tap-box. This influx prevails until the water of the tap-box has attained that temperature at which the mercury assumes the position shown in Fig. 5. The water entering at $o'$ will then again flow off through $l^7$. The overflow-tube $l^4$ insures a constant level.

Fig. 8 shows an arrangement in which the automatic refrigeration of the tap-box is effected simultaneously with the cooling of the cellar. The drawing will be understood without further comment.

As will easily be seen, the most varied arrangements may be chosen for such water and ice refrigeration, which, however, are all based upon the common principle to refrigerate in a regulatable manner upon the whole length of the course of the beer. These refrigerating arrangements according to my experiments are perfectly suitable to answer all just requirements with respect to refrigeration and can be kept exactly or constantly regulated to the extent of one-half degree centigrade. The same are allowed to act day and night, so that in the morning the beer which stands immediately behind the plug of the tap is exactly of the same quality and tastefulness as that which is contained in the barrel.

What I claim, and desire to secure by Letters Patent of the United States, is—

1. The combination with the storage-chamber containing the ice-box $k^2$ having water-chamber H, of the box $k$ above the said chamber and having the superimposed box $k'$, the pipe $l^2$ connecting the box $k'$ with the said water-chamber, the coil $l^{12}$ in the ice-box having pipe connection $l^3$ with the box $k$ and also connected with the chamber H, and the overflow-pipe $l^4$ for the box $k$, substantially as described.

2. In a beer drawing and refrigerating apparatus, the combination with the storage-chamber containing a refrigerating vessel, of the box $k$ having the superimposed ice-box $k'$, a pipe leading from said ice-box $k'$ to the said refrigerating vessel, the gas vessel B located in the box $k$ and connected with a pipe containing mercury, said last-mentioned pipe intersecting the ice-water pipe, and a valve $u$ adapted to regulate the flow of said ice-water, substantially as described.

THEODOR SCHNUTZ.

Witnesses:
GEORGE S. FOSTER,
A. SCHUERMANN RUPISI.